United States Patent
Hokkanen et al.

(10) Patent No.: US 10,794,037 B2
(45) Date of Patent: Oct. 6, 2020

(54) SYSTEM AND METHOD FOR POSITIONING CONSTRUCTION MACHINE

(71) Applicant: NOVATRON OY, Pirkkala (FI)

(72) Inventors: Visa Hokkanen, Pirkkala (FI); Mikko Vesanen, Pirkkala (FI); Tomi Vittinki, Pirkkala (FI); Jarkko Leppanen, Pirkkala (FI)

(73) Assignee: NOVATRON OY, Pirkkala (FI)

( * ) Notice: Subject to any disclaimer, the term of this patent is extended or adjusted under 35 U.S.C. 154(b) by 0 days.

(21) Appl. No.: 15/126,491

(22) PCT Filed: Mar. 18, 2015

(86) PCT No.: PCT/FI2015/050180
§ 371 (c)(1),
(2) Date: Sep. 15, 2016

(87) PCT Pub. No.: WO2015/140406
PCT Pub. Date: Sep. 24, 2015

(65) Prior Publication Data
US 2017/0089032 A1    Mar. 30, 2017

(30) Foreign Application Priority Data
Mar. 18, 2014 (FI) ...................................... 20145249

(51) Int. Cl.
*E02F 3/43* (2006.01)
*E02F 9/26* (2006.01)
(Continued)

(52) U.S. Cl.
CPC ............... *E02F 3/431* (2013.01); *E02F 3/32* (2013.01); *E02F 3/435* (2013.01); *E02F 9/262* (2013.01); *E02F 9/265* (2013.01); *G01S 19/14* (2013.01)

(58) Field of Classification Search
CPC ... E02F 3/431; E02F 3/32; E02F 3/435; E02F 9/262; E02F 9/265; E02F 9/2037; G01S 19/14; G05D 1/10
See application file for complete search history.

(56) References Cited

U.S. PATENT DOCUMENTS

| 4,829,418 A | 5/1989 | Nielsen et al. |
| 5,178,510 A | 1/1993 | Hanamoto et al. |

(Continued)

FOREIGN PATENT DOCUMENTS

| GB | 2490679 A | 11/2012 |
| WO | 93/01080 A1 | 1/1993 |

(Continued)

OTHER PUBLICATIONS

International Application No. PCT/FI2015/050180, International Preliminary Report on Patentability, 6 pages, dated Jul. 27, 2016.
(Continued)

*Primary Examiner* — Adam R Mott
(74) *Attorney, Agent, or Firm* — FisherBroyles, LLP (57) ABSTRACT

A positioning system and a method of positioning a construction machine on a work site include at least one reference point on the work site. Position data of the reference point is determined in a work site coordinate system and input to a control unit of the construction machine. A tool is calibration positioned in accordance with the reference point in order to connect a machine coordinate system to the work coordinate system.

14 Claims, 4 Drawing Sheets

(51) Int. Cl.
*G01S 19/14* (2010.01)
*E02F 3/32* (2006.01)

(56) References Cited

U.S. PATENT DOCUMENTS

| | | | |
|---|---|---|---|
| 5,964,298 A | 10/1999 | Greenspun | |
| 6,418,364 B1* | 7/2002 | Kalafut | G01C 21/00 |
| | | | 172/2 |
| 8,686,899 B2* | 4/2014 | Jakab | G01S 19/34 |
| | | | 342/357.26 |
| 2009/0326734 A1* | 12/2009 | Gudat | E02F 9/2054 |
| | | | 701/2 |
| 2014/0032060 A1* | 1/2014 | Zinke | B66C 23/78 |
| | | | 701/50 |
| 2014/0163885 A1* | 6/2014 | Clar | G01C 15/00 |
| | | | 702/5 |

FOREIGN PATENT DOCUMENTS

| | | |
|---|---|---|
| WO | 2004019459 A2 | 3/2004 |
| WO | 2010/060459 A1 | 6/2010 |

OTHER PUBLICATIONS

International Application No. PCT/FI2015/050180, Written Opinion of the International Searching Authority, 6 pages, dated Jul. 9, 2015.
International Application No. PCT/FI2015/050180, International Search Report, 5 pages, dated Jul. 10, 2015.
Finnish Application No. 20145249, Search Report and Opinion on Patentability, 6 pages. dated Oct. 22, 2014.
Finnish Application No. 20145249, Search Report 2 and Opinion on Patentability, 7 pages. dated Aug. 31, 2015.
Adams, et al., "Computer-Assisted Surgery," IEEE Computer Graphics and Applications, pp. 43-51, ISSN 0272-1716, vol. 10(3), May 1990.

\* cited by examiner

SYSTEM AND METHOD FOR POSITIONING CONSTRUCTION MACHINE

CROSS-REFERENCE TO RELATED APPLICATIONS

This application is a National Stage application of International Application No. PCT/FI2015/050180, filed Mar. 18, 2015, which claims benefit to Finnish Application No. FI 20145249, filed Mar. 18, 2014, which are incorporated by reference herein in their entireties.

BACKGROUND

Field

The invention relates to a positioning system of a construction machine. The positioning system comprises measuring devices for determining position and heading of a boom and tool of the machine. The construction machine is provided with a control unit for performing needed positioning calculations as a response to receiving measuring data. The position of the boom and tool may be determined in a machine coordinate system of the excavator.

The invention further relates to a method of positioning a construction machine on a work site.

The field of the invention is defined more specifically in the preambles of the independent claims.

Description of the Related Art

Different types of construction machines may be utilized in work sites. The construction machines are used in excavation work, earth-moving work, road construction and building construction, for example. Typically the construction machine needs to be positioned rather accurately on the work site in order to execute designed operations. The current position of the machine may be determined by means of a satellite-based positioning system GNSS (Global Navigation Satellite Systems), such as GPS (US), GLONASS (RU), Galileo (EU) or Compass (CN). Alternatively, the position of the machine may be determined by means of a total station. However, the known positioning systems require use of extensive measurement equipment, which are complicated, difficult to use and expensive.

SUMMARY

An object of the invention is to provide a novel and improved positioning system for a construction machine. A further object is to provide a novel and improved method of positioning a construction machine.

The positioning system according to the invention is characterized in that the positioning system comprises at least one reference point on a work site; position data of the reference point in a work site coordinate system is input to the control unit; and the control unit is configured to connect the machine coordinate system to the work site coordinate system as a response to a calibration positioning wherein the tool is positioned in accordance with the reference point.

The method according to the invention is characterized by defining at least one reference point on the work site; determining position of the reference point in a work site coordinate system by means of at least one surveying device external to the construction machine; inputting the position data of the reference point to the control unit; positioning the tool in accordance with the reference point; determining the position of the tool in the machine coordinate system when the tool is positioned in accordance with the reference point; and connecting the machine coordinate system of the excavator to the work site coordinate system on the basis of the position data of the reference point and the determined heading of the tool.

An idea of the disclosed solution is that one or more reference points are determined on the work site. Position data of the reference point in a work site coordinate system is determined and is offered for a control unit of the construction machine. A tool of the construction machine is calibration positioned in accordance with the determined one or more reference points in order to connect a machine coordinate system of the construction machine to the work site coordinate system.

An advantage of the disclosed solution is that the construction machine needs not necessarily be provided with any onboard positioning device since the positioning is based on one or more reference points provided with coordinate data. Thus, the positioning system onboard the machine may be rather simple and inexpensive. An additional advantage is that the operation of the construction machine is not dependent on capability of receiving continuously satellite signals or other external measuring signals, whereby the positioning system may be implemented in work sites and situations where the receiving of external signals is poor or totally prevented. Thus, the disclosed positioning system may also be used when performing the work cycle under overhead and shielding obstacles or structures, for example.

According to an embodiment, the position of the boom and tool may be determined in a machine coordinate system of the excavator in 3D space. All the measurements and positioning determinations may then be made in 3D space.

According to an embodiment, the positioning system implements one or more reference points, which are on a work site inside a reach area of the tool. The tool may then be placed on the reference point, in contact with the reference point or adjacent with the reference point. One single reference point is a minimum requirement for the positioning.

According to an embodiment, the positioning system implements one or more reference points, which are marked on a work site. The marking may be a paint marking made to ground surface, rock surface or any other surface located on the work site. Alternatively, the marking may be a pit, a groove or any other irregularity made to any surface located on the work site. When the construction machine is an excavator, the marking can be made by means of a bucket. The control unit of the construction machine is configured to connect the machine coordinate system to the work site coordinate system as a response to a calibration positioning wherein the tool is positioned on the marked reference point or in accordance with the reference marking.

According to an embodiment, the positioning system implements one or more physical objects as reference points. The physical reference point may be a man-made object, which may be arranged on the work site by an operator or a surveying team. The physical object may be a stake, a bolt arranged to soil, or a simple cone, for example. The control unit of the construction machine is configured to connect the machine coordinate system to the work site coordinate system as a response to a calibration positioning wherein the tool is positioned in accordance with the defined reference point. The tool may be positioned on the reference object, in contact with it or close to it.

According to an embodiment, the positioning system implements one or more physical objects as reference points. The reference point may be a natural object located on a work site inside a reach area of the tool. The natural object may be a stone, a stub, a tree, a pit on the ground, an edge of a rock surface, or any other corresponding object that exists inside the working area and can be detected. When the movable reference object such as the stone is used as the reference marker, the reference marker may be moved by the construction machine to a suitable place if needed. The control unit of the construction machine is configured to connect the machine coordinate system to the work site coordinate system as a response to a calibration positioning wherein the tool is positioned on the basis of the selected reference point. The tool may be calibration positioned on the natural object or it may have a side contact with it.

According to an embodiment, position of the reference point is determined by means of an external surveying device. The external surveying device may comprise at least one mobile surveying device, such as a total station or a positioning device. Alternatively, the position determination may be based on satellite navigation. The defined reference point may be a man-made marking or object, or is a natural object.

According to an embodiment, the positioning system implements one or more reference points. The tool is positioned at a distance from the reference point and the three dimensional distance between the tool and the reference point is measured and input to the control unit in order to connect the machine coordinate system to the work site coordinate system. Difference of coordinates of the tool position relative to the position of the reference point may be determined by means of the measurements. Thus, coordinates dx, dy and dz of the tool position may be defined.

According to an embodiment, the positioning system may utilize known position data of another mobile machine. Thus, a second construction machine provided with an onboard surveying device may serve as a reference point on the work site. The second construction machine may be provided with a total station or satellite navigation system for determining its position. On the work site may be one or more first construction machines, which do not need to be provided with any onboard positioning system, but instead their position may be determined by means of the second construction machine. A tool of the first construction machine may be positioned to a defined reference position in the second construction machine. Tools of the first and second construction machine may be set against each other, for example. Alternatively, a positioning spot may be determined on the carrier of the second machine. A control unit of the first construction machine may then receive positioning data of the second construction machine from a control unit of the second construction machine. Thereafter, the control unit of the first construction machine may determine and calculate position of the first construction machine. Thanks to this embodiment, it is sufficient to utilize onboard positioning system of the second construction machine for determining positions of one or more other machines operating on the same work site. Thus, utilization of expensive onboard positioning systems is improved.

According to an embodiment, the positioning system may utilize known position data of another mobile machine. Position of a second construction machine may be determined by means of an external surveying device. The second construction machine may then serve as a reference point for one or more first construction machines operating on the same work site. A tool of the first construction machine may be positioned to a reference position defined for the second construction machine. Tools of the first and second construction machine may be set against each other, for example. A control unit of the first construction machine may then be provided with positioning data of the second construction machine. Thereafter, the control unit of the first construction machine may determine and calculate position of the first construction machine. Thanks to this embodiment, it is sufficient to determine position of the second construction machine and to utilize that initial position data for determining positions of other machines operating on the same work site. There is no need to determine any other reference markings of objects on the work site.

According to an embodiment, the reference point is a physical mark made by the tool on the work site. It is possible to make a pit or spot on a ground surface by means of the tool, for example. The position of the made marking is determined by means of the control unit when the current position of the tool is known in the work site coordinate system. The reference point may be created and utilized by the same construction machine. The construction machine may then make a reference marking for itself before a transfer drive on the work site, and after the drive it may calibrate its position by means of the made reference marking. Alternatively, the reference point on the work site is created by a second construction machine and is utilized by a first construction machine.

According to an embodiment, the control unit of the construction machine is configured to indicate position data of the tool in work site coordinates. This feature facilitates operation of the operator of the construction machine, because work plans and instructions are usually tied to the work site coordinates. The construction machine may comprise one or more display devices for showing the determined position data and working instructions in work site coordinates.

According to an embodiment, the positioning system onboard the construction machine is without a dedicated positioning device configured to determine the position of the carrier on the work site.

According to an embodiment, the positioning system is without any satellite-based navigation system. When the positioning system is without any GNSS system, the system may then be simple and inexpensive.

According to an embodiment, the positioning system is without a total station. An advantage is that expensive measuring device may be left out and the system may also be more failure safe when sensitive measuring devices are not on-board.

According to an embodiment, the positioning system is also provided with a satellite-based navigation system. When the construction machine is in a position with good satellite connection, then the onboard satellite positioning system may be used. If the connection to the satellites is lost, then the positioning system may operate without the satellite navigation. The positioning system may use positioning data determined before the connection was lost, or before the positioning failed in any other way. The positioning system utilizes machine coordinate system when operating in the reach area of the boom. In this embodiment the positioning system comprises one or more receivers for receiving satellite signals, and further, the processor is provided with an algorithm for executing needed calculations.

According to an embodiment, the positioning system is also provided with a total station. When the construction machine is in a position with good signal connection to the total station, then the positioning system based on total station may be used. If the connection to the total station is lost, then the positioning system may operate without the total station navigation. The positioning system may use positioning data determined before the connection was lost. Then the positioning system utilizes machine coordinate system when operating in the reach area of the boom. In this embodiment the positioning system comprises one or more receivers for receiving signals of the total station, and further, the processor is provided with an algorithm for executing needed calculations.

According to an embodiment, the positioning system, the construction machine, or they both may comprise one or more display devices for showing the determined position data for the operator. On the display device numerical data, working plans and instructions, maps and relative position data may be displayed.

According to an embodiment, the construction machine is an excavator. The excavator comprises a boom which may be provided with different changeable tools, which serve as auxiliary equipment of the excavator. The boom of the excavator may be equipped with any kind of working device serving as the tool. The position of the tool may be determined by means of the disclosed positioning system.

According to an embodiment, the construction machine is a mobile crane. The mobile crane may be provided with a man cage or a lifting member serving as a tool.

According to an embodiment, the construction machine is a pile-driving machine. A pile driver is a mechanical device used to drive piles into soil to provide foundation support for buildings or other structures. The pile driving machine may comprise a carrier, a boom and a pile driving tool supported to the boom.

According to an embodiment, the tool of the construction machine is a bucket. The construction machine may be an excavator. The excavators and other digging machines are used for moving, shaping and leveling soil.

According to an embodiment, the tool comprises at least one measuring point. The measuring point may be predetermined. Alternatively, the measuring point may be set by the operator.

According to an embodiment, the tool is a bucket and the measuring point is located at a corner of a lip plate of the bucket. The lip plate may be a plate-like element and it may or may not comprise several dipper teeth.

According to an embodiment, the tool is a bucket and the measuring point is located in a middle of a lip plate of the bucket.

According to an embodiment, the positioning system utilizes two or more known reference points. Position data of the reference points in the work site coordinate system is input to the control unit. Further, the heading measuring device comprises at least one sensor for determining relative directions between the tool and the carrier. Then, the control unit is capable of calculating position and absolute heading of the tool as a response to positioning the tool in accordance with the two or more known reference points.

According to an embodiment, the at least one heading measuring device comprises one or more relative heading measuring devices.

According to an embodiment, the at least one heading measuring device comprises one or more absolute heading measuring devices.

According to an embodiment, the absolute heading measuring device comprises one or more magnetic compasses.

According to an embodiment, the absolute heading measuring device comprises one or more satellite based compasses.

According to an embodiment, the construction machine comprises a rotation center between an under carriage and an upper carriage of the construction machine. The rotation center allows the upper carriage to be rotated relative to the under carriage around rotation axis of the rotation center. A control unit of the construction machine may determine position of a rotation center of the construction machine in the work site coordinate system. Further, the control unit is configured to determine the position and direction of the tool relative to the rotation axis of the rotation center.

According to an embodiment, the control unit of the construction machine is provided with one or more production models. The production model may comprise three-dimensional (3-D) design data for the work site in the work site coordinate system. The control unit may determine the current position of the tool relative to the input production model and may indicate the determined relative position of the tool to the operator of the construction machine. This embodiment facilitates and fastens work of the operator. The production model may be an excavation plan, for example. The production model may be a predesigned production model, which may retrieved or input to the control unit. The needed material and data may be loaded to the control unit via the Internet or any other data network, for example. The production model may be predesigned by means of computer aided design programs as an office work. Alternatively, the production model may be produced and input manually by the operator to the control unit.

According to an embodiment, the control unit of the construction machine is provided with one or more production models. The control unit may display on a display device the current position of the tool relative to the production model. Thanks to this embodiment the operator is provided with visual data, which is easy and fast to adopt.

According to an embodiment, the positioning system comprises one or more boom position measuring devices for determining position of the tool of the construction machine relative to a carrier in a machine coordinate system. The boom position measuring device may comprise inclination sensors arranged on a boom, an upper carrier and the tool. The sensing data may be transmitted to the control unit, which may determine the position of the tool relative to a rotating center of the machine, or relative to any other point on the carrier.

According to an embodiment, kinematic data of the construction machine is input to a control unit of the machine. Dimensions and shapes of the boom parts, as well as joints of a boom and paths of movements may be stored and input to the control unit. Thanks to the measuring data and the kinematic data the control unit is able to determine the position of the tool relative to a carrier.

According to an embodiment, only one single reference point is used. Thus, at minimum one reference point on a work site is needed. Thanks to this embodiment, fast, simple, cheap and convenient positioning arrangement may be achieved.

According to an embodiment, the one or more reference points are located on the ground. Positioning the reference points on the ground is simple and fast.

According to an embodiment, the one or more reference points are immovably arranged at the work site. At least the reference points are not provided with any moving elements or are not connected to any moving members.

According to an embodiment, the one or more reference points are stand-alone independent objects not being arranged in connection with any kind of machine or auxiliary device. Thus, the reference point may be without any mechanical functionality.

According to an embodiment, the means for determining inclination of the carrier comprises one or more inclination sensors, which may be arranged on an upper carriage of the carrier. Alternatively, any other measuring device, sensor or system suitable for measuring the inclination may be utilized. Measuring results may be retrieved, loaded or input to a control device, which may calculate needed coordinate transformations so that the possible slanted position of the construction machine may be taken into account.

According to an embodiment, at least one reference point on a work site is provided with at least one remote readable identifier or data storage device or media comprising position data of the reference point in a work site coordinate system. The construction machine may then be provided with a scanner or reading device for reading the stored coordinate data from a distance. The remote readable identifier or tag may be read wirelessly by using radio signals, for example. The reading process may be automated so that the reading device of the construction machine automatically detects the remote readable identifier located inside a coverage area of the reading device and automatically inputs the stored coordinate data to the control unit. The remote readable identifier may be a RFID tag. Radio-frequency identification (RFID) is the wireless use of electromagnetic fields to transfer data, for the purposes of automatically identifying and tracking tags attached to objects. The tags contain electronically stored coordinate information.

Let it be mentioned that in this patent application the term "input" means manual, as well as automatic, feeding or loading of data and parameters to the control unit. Thus, the data may be input manually by using a user interface or it may be machine read wirelessly or by means of wire communication, for example.

The above-disclosed embodiments may be combined to form suitable solutions provided with necessary features disclosed.

BRIEF DESCRIPTION OF THE DRAWINGS

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION

Figure 1:
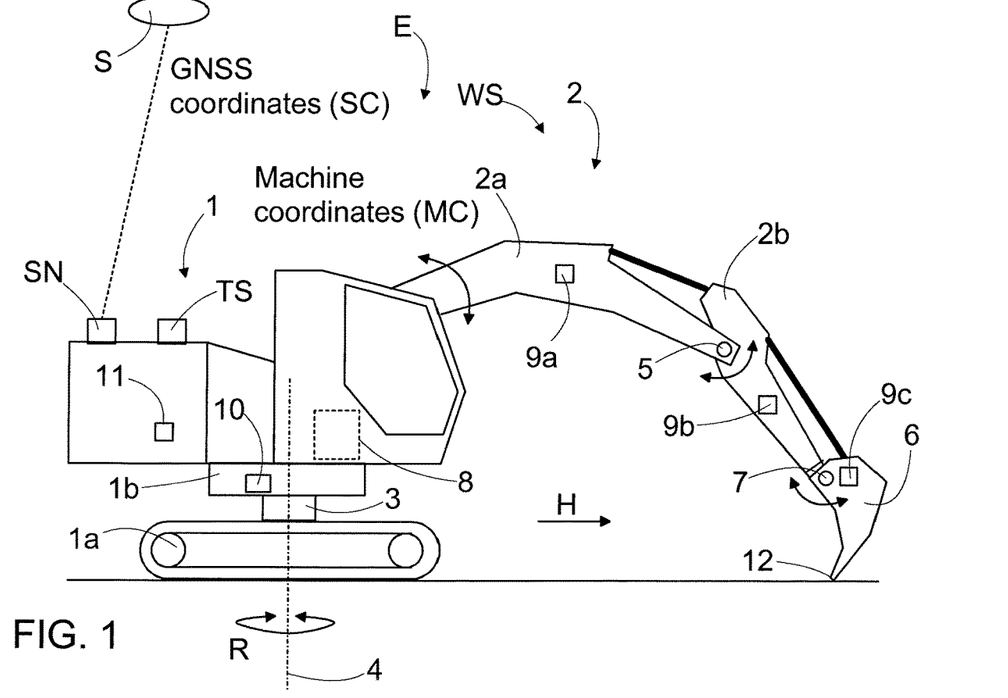
FIG. 1 is a schematic side view of an excavating machine provided with a positioning system.

FIG. 1 shows an excavator E comprising a movable carrier 1 on which a boom 2 is arranged. The excavator is one example of a construction machine. The carrier 1 may comprise an under carrier 1a and an upper carrier 1b. The upper carrier 1b may be connected to the under carrier 1a by means of a rotating axle 3. The upper carrier 1b may be rotated R around a rotating axis 4 of the rotating axle 3. The boom 2 is arranged to turn together with the upper carrier 1b. Direction of the boom 2, i.e. a heading H is shown by means of an arrow in FIG. 1. The boom 2 may comprise a first boom part 2a and a second boom part 2b. The first boom part may be connected to the carriage 1 by means of first joint, which is not shown. The second boom part 2b may be connected to the first boom part 2a by means of a second joint 5. At a distal end of the second boom part 2b is a tool, in this case a bucket 6, and between the bucket 6 and the second boom part 2b may be a third joint 7. In connection with the third joint 7 may also be joints or mechanisms allowing the bucked to be tilted in a sideward direction.

The excavator E is provided with a positioning system comprising one or more control units 8 and several boom measuring devices 9a-9c for determining position of the bucket 6 relative to the carrier 1 in a machine coordinate system MC of the excavator. The boom measuring devices 9a-9c may be inclination sensors, for example. Further, the carrier 1 may be provided with one or more heading measuring devices 10 for determining direction of the boom 2 and the bucket 6. The heading measuring device 10 may be a magnetic compass, satellite-based compass or gyroscope. Alternatively, the heading may be determined by determining slew of the upper carriage 1b relative to the under carriage 1a by means of one or more sensors arranged in connection with the rotating axle 3. In addition to the relative position of the upper carriage 1b and the under carriage 1a, grid north may be defined by means of a compass. Inclination of the carrier 1 may also be determined by means of one or more inclination sensors 11 arranged on the upper carriage 1b.

The gathered measuring data of the sensors may be transmitted to the control unit 8 which may process the data and calculate position of a tip 12 of the tool 6.

The construction machine E may also be provided with a GNSS satellite positioning system, comprising one or more satellite receiving devices SN for receiving signals from satellites S. The receiving device SN may be placed on the carrier 1 and the control unit may calculate position of the tool on the basis of the received satellite based position data. Alternatively, the construction machine may be equipped with another onboard position measuring device, such as a total station TS.

Figure 2:
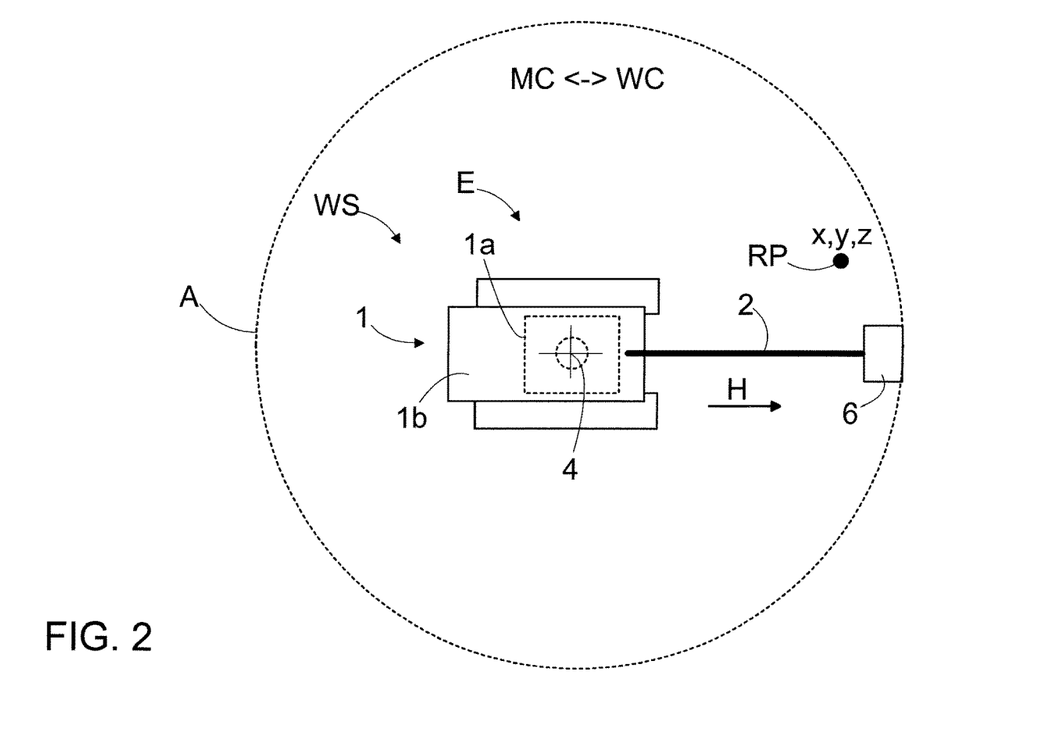
FIG. 2 shows schematically and seen from above the principle of utilizing a reference point provided with coordinate data for determining position of the excavator.

FIG. 2 discloses a work site WS of a construction machine E. The work site WS comprises a reference point RP. Position data of the reference point may be determined by means of an external surveying device. The position data of the reference point RP may be utilized for connecting the machine coordinate system MC of the construction machine to a work site coordinate system WC. This is disclosed above in this application. The reference point RP may be located inside a reach are A of the tool 6 so that the tool 6 may be placed adjacent the reference point RP during the calibration positioning.

Figure 3:
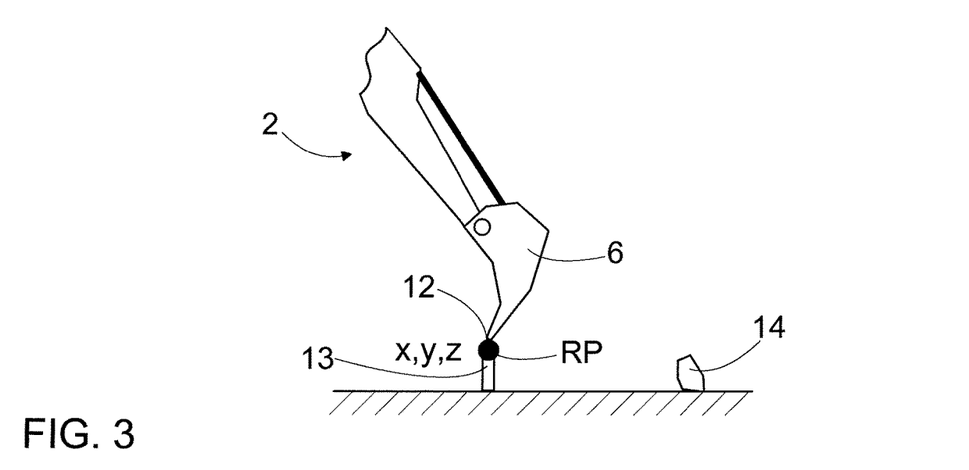
FIG. 3 is a schematic side view showing positioning of a tool on a reference point provided with pre-determined coordinate data.

In FIG. 3 a tool 6 of a construction machine is calibration positioned on a reference point RP. The reference point RP may be an artificial object such as a stake 13, a marking or it may be a natural object such as a stone 14. A tip 12 of the tool 6 may be accurately positioned in accordance with the reference point RP and the measuring system and a control unit may then determine the position of the tool 6.

Figure 4:
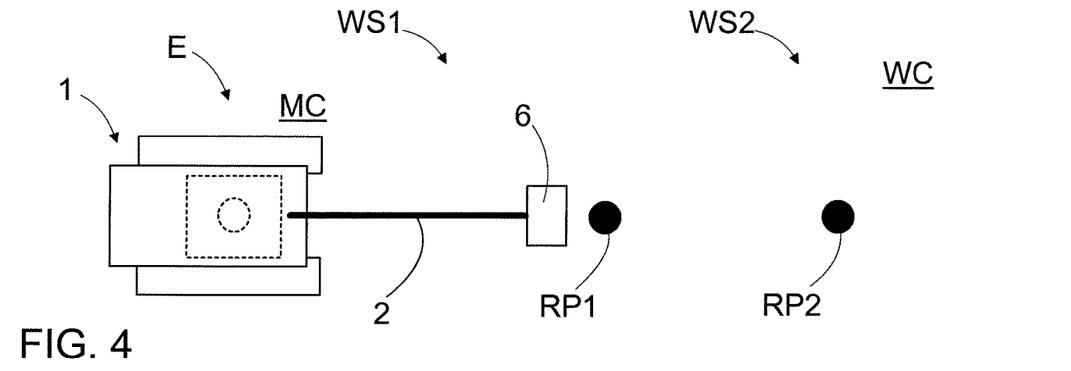
FIG. 4 shows schematically and seen from above that the construction may generate new reference markings in order to allow the machine to be moved to a new working position or work site.

FIG. 4 discloses a procedure allowing transfer driving the construction machine to a new working position or work site. The procedure is as follows. A predetermined initial reference point RP1 of a first work site WS1 is detected and utilized in creating reference positioning data for at least one second work site WS2. Then at least one new reference point RP2 on the ground G of the first work site WS1 is generated by means of the tool 6. Coordinates of the new reference point RP2 are determined on the basis of the position data of the initial reference point RP1 and measuring data of sensors and measuring device of the construction machine E. The carrier 1 of the construction machine E may be driven from the first work site WS1 to the second work site WS2, which second work site WS2 is located so that the new reference point RP2 defined on the first work site WS1 is located inside the reach area of the tool 6. When the carrier 1 is stopped, the tool 6 is positioned on the new reference point RP2. Then the control unit retrieves determined coordinates of the new reference point RP2 and also determines heading of the tool 6. Finally the control unit may connect the machine coordinate system MC of the construction machine E on the second work site WS2 to the work site coordinate system WC by means of the positioning data of the new reference point RP2.

Figure 5A:
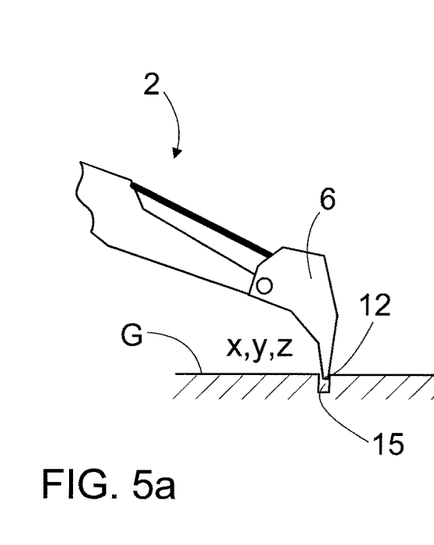
FIGS. 5a and 5b show schematically and from side that the bucket may be used to generate a reference marking to a surface of the ground and the generated marking may be used to determine new position after movement of the excavator.
Figure 5B:
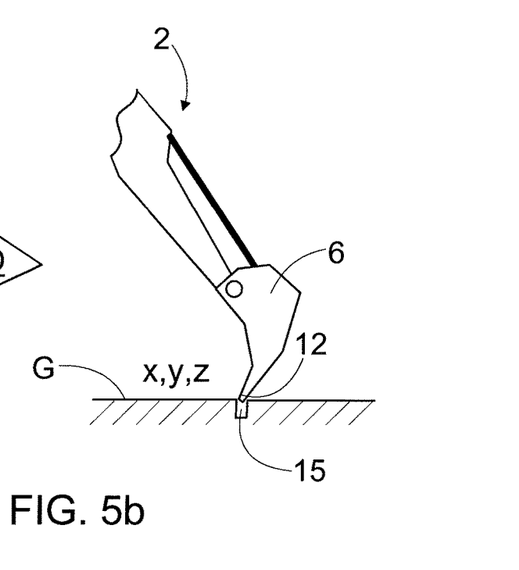

FIGS. 5a and 5b discloses that a tool 6 of a construction machine may be used to generate an artificial reference marking, such as a pit 15 to a surface of the ground G. The generated marking 15 may be used to determine new position after a transfer drive D of the construction machine. This way, the construction machine may generate new reference points RP on the work site WS in order to allow movement of the carrier. Further, the position markings may be generated in order to be utilized by other construction machines on the work site WS.

Figure 6:
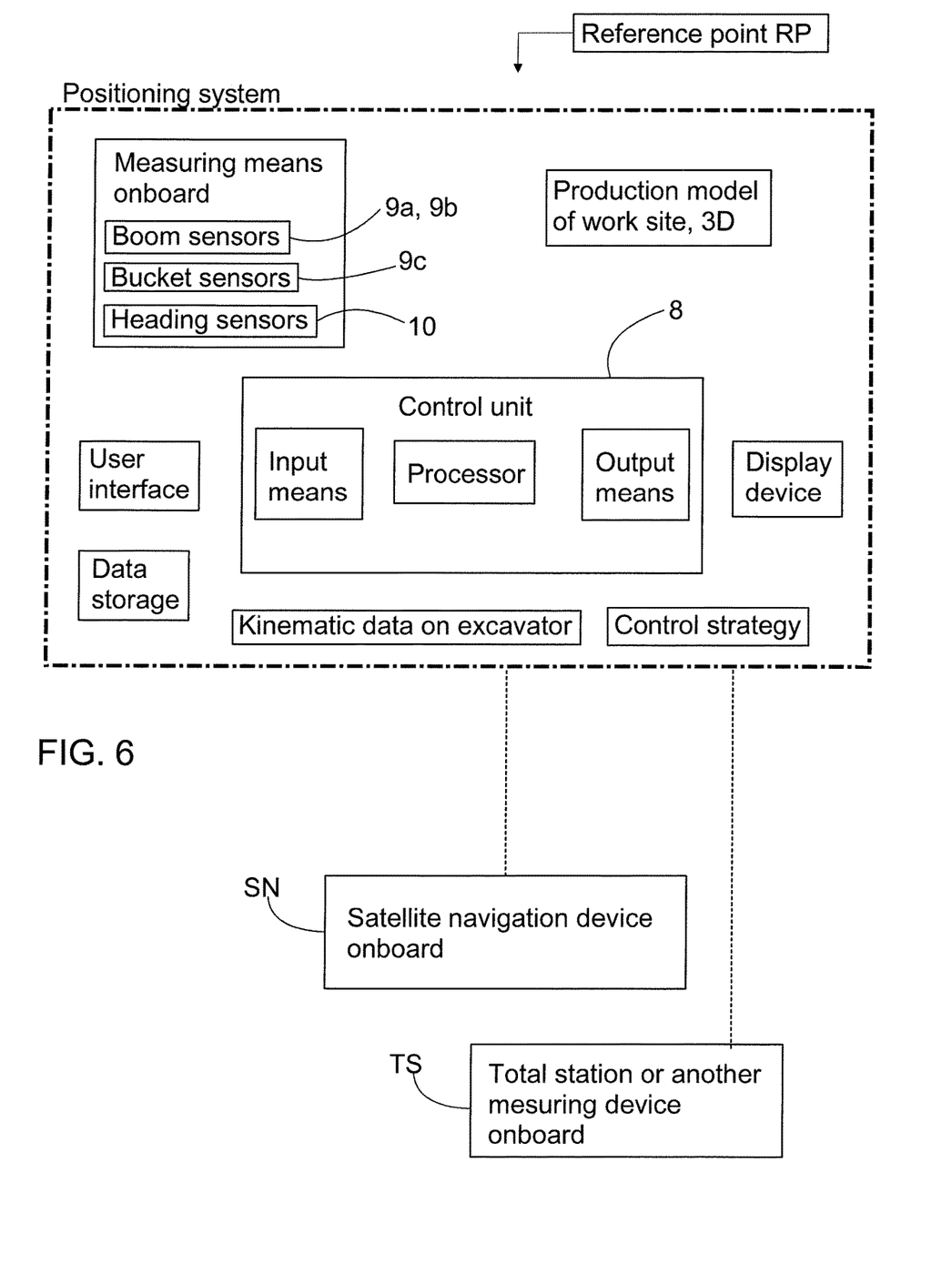
FIG. 6 shows schematically some components of the disclosed positioning system.

FIG. 6 discloses some components and features of the disclosed positioning system. These issues have already been disclosed above in this application.

Figure 7:
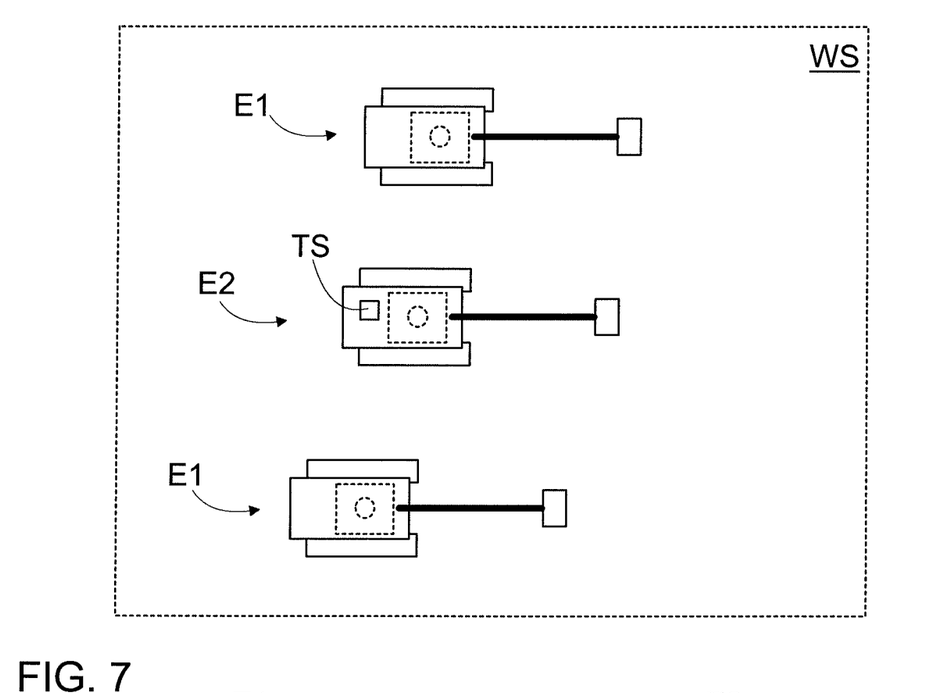
FIG. 7 is schematic top view of several operating construction machines on the same work site and utilizing one construction machine as a reference point.

FIG. 7 shows that on the same work site WS may operate several construction machines E1, E2. One or more first construction machines E1 may utilize a second construction machine E2 as reference point. The second machine E2 may be provided with at least one position detecting device, such as a total station TS.

Figures 8, 9:
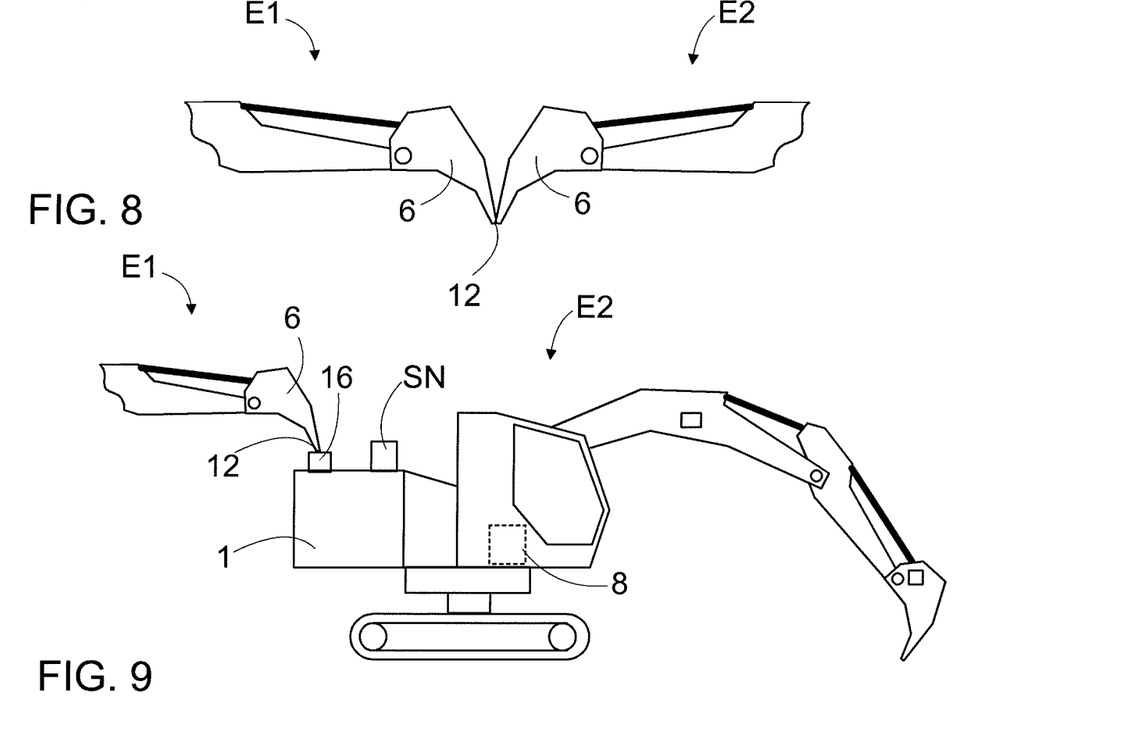
FIGS. 8 and 9 are schematic side views of alternative ways of using another construction machine as a reference point.

FIGS. 8 and 9 are schematic side views of alternative ways of using another construction machine as a reference point. In FIG. 8 tools 6 of a first construction machine E1 and a second construction machine E2 may be positioned against each other in order to provide the first machine E1 with the needed positioning data. Tips 12 of the tool 6 may be placed against each other, for example. In FIG. 9 toll 6 of a first construction machine E1 is placed on a determined calibration point 16 locating on a carrier 1 of a second construction machine E2.

The drawings and the related description are only intended to illustrate the idea of the invention. In its details, the invention may vary within the scope of the claims.

What is claimed is:

1. A positioning system of a construction machine for connecting a machine coordinate system of the construction machine to a work site coordinate system, the positioning system comprising:
   the machine coordinate system of the construction machine;
   at least one boom measuring device for determining a position of a tool of the construction machine relative to a carrier in the machine coordinate system;
   at least one heading measuring device for determining a heading of the tool where the heading measuring device comprises a magnetic compass or a gyroscope;
   means for determining an inclination of the carrier;
   at least one control unit comprising at least one processor for determining the position and the heading of the tool in the machine coordinate system based on measuring data input to the control unit;
   at least one reference point on a work site, position data of the reference point being determined in the work site coordinate system by a surveying device external to the construction machine and the position data of the reference point in the work site coordinate system being input to the control unit by automatically reading a remote readable RFID tag or manually through a user interface or machine reading, the control unit being configured to connect the machine coordinate system to the work site coordinate system as a response to a calibration positioning wherein the tool is positioned in accordance with the reference point.

2. The positioning system as claimed in claim 1, wherein the construction machine is an excavator.

3. The positioning system as claimed in claim 1, wherein the tool is a bucket.

4. The positioning system as claimed in claim 1, wherein the at least one reference point is marked on the work site inside a reach area of the tool, the tool being positioned on the reference point.

5. The positioning system as claimed in claim 1, wherein the tool comprises at least one measuring point.

6. The positioning system as claimed in claim 1, wherein the control unit is configured to indicate position data of the tool in work site coordinates.

7. The positioning system as claimed in claim 1, wherein the positioning system comprises at least two reference points, position data of the reference points in the work site coordinate system being input to the control unit, the heading measuring device comprising at least one sensor for determining relative headings between the tool and the carrier, the control unit being configured to calculate the position and an absolute heading of the tool as a response to positioning the tool in accordance with the at least two reference points.

8. The positioning system as claimed in claim 1, wherein the control unit is configured to determine a position of a rotation center of the construction machine in the work site coordinate system, the rotation center being located between an under carriage and an upper carriage of the construction machine which allows the upper carriage to be rotated relative to the under carriage around a rotation axis of the rotation center, the control unit being configured to determine the position and the heading of the tool relative to the rotation axis of the rotation center.

9. The positioning system as claimed in claim 1, wherein at least one production model is input to the control unit, the production model comprising three-dimensional design data for the work site in the work site coordinate system, the control unit being configured to determine a current position of the tool relative to the input production model, the control unit being configured to indicate the determined relative position of the tool to an operator.

10. The positioning system as claimed in claim 1, wherein at least one production model is input to the control unit, the production model comprising three-dimensional design data for the work site in the work site coordinate system, the control unit being configured to determine a current position of the tool relative to the input production model, the control unit being configured to indicate the determined relative position of the tool to an operator, the control unit being configured to display on a display device a current position of the tool relative to the input production model.

11. A method of positioning a construction machine on a work site by connecting a machine coordinate system of the construction machine to a work site coordinate system, the method comprising:
- determining a position of a tool of the construction machine in the machine coordinate system of the construction machine relative to a carrier by means of at least one boom measuring device;
- determining a heading of a tool by means of at least one heading measuring device, where the at least one heading measuring device comprises a magnetic compass or gyroscope;
- determining a position of the carrier;
- determining an inclination of the carrier;
- inputting produced measuring data to at least one control unit and determining a current position of the tool;
- defining at least one reference point on the work site;
- determining position data of the reference point in the work site coordinate system by means of at least one surveying device external to the construction machine;
- inputting the position data of the reference point to the control unit by automatically reading a remote readable RFID-tag or manually through a user interface or machine reading;
- positioning the tool in accordance with the reference point;
- determining the position of the tool in the machine coordinate system when the tool is positioned in accordance with the reference point; and
- connecting the machine coordinate system of the construction machine to the work site coordinate system based on the position data of the reference point and the determined heading of the tool.

12. The method according to claim 11, further comprising:
- utilizing a predetermined initial reference point of a first work site in creating reference positioning data for at least one second work site;
- defining at least one new reference point on the first work site by means of the tool;
- determining coordinates of the new reference point;
- moving the carrier of the construction machine from the first work site to the second work site, the second work site being located so that the new reference point defined on the first work site is located inside a reach area of the tool;
- positioning the tool on the new reference point after transfer movement of the carrier;
- retrieving the determined coordinates of the new reference point;
- determining the heading of the tool; and
- connecting the machine coordinate system of the construction machine on the second work site to the work site coordinate system by means of the positioning data.

13. The method according to claim 11, further comprising utilizing the work site coordinate system for presenting the current position of the tool.

14. The method according to claim 11, further comprising:
- inputting at least one production model to the control unit, the production model comprising predesigned three-dimensional design data for the work site in the work site coordinate system;
- displaying the three-dimensional design data on at least one display device for an operator of the construction machine; and
- displaying the current position of the tool on the display device relative to the design data.

* * * * *